United States Patent [19]

Kaneko et al.

[11] Patent Number: 4,894,998
[45] Date of Patent: Jan. 23, 1990

[54] ABSORPTION SYSTEM HOT AND COLD WATER SUPPLY APPARATUS

[75] Inventors: Toshiyuki Kaneko; Shigenori Tateshita, both of Ota; Norio Sawada, Oizumi; Hisao Honda; Takaki Iwaya, both of Ota, all of Japan

[73] Assignee: Sanyo Electric Co., Ltd., Osaka, Japan

[21] Appl. No.: 227,878

[22] Filed: Aug. 3, 1988

[30] Foreign Application Priority Data

Aug. 26, 1987 [JP] Japan ................................. 62-212559

[51] Int. Cl.⁴ ............................................ F25B 15/00
[52] U.S. Cl. ........................................ 62/148; 62/476
[58] Field of Search .................................. 62/148, 476

[56] References Cited

U.S. PATENT DOCUMENTS 3,426,548 2/1969 Greacen et al. ................. 62/148 X
3,831,390 8/1974 Hopkins ............................ 62/476 X
3,837,174 9/1974 Miyagi ............................. 62/148 X

*Primary Examiner*—Lloyd L. King
*Attorney, Agent, or Firm*—Wenderoth, Lind & Ponack

[57] ABSTRACT

In an absorption system hot and cold water supply apparatus for simultaneously supplying hot water and cold water, there is provided a refrigerant blow device for blowing a refrigerant into a refrigerant circulation path, thermo-capacity control device for carring out heating control of a generator by a cold water temperature or a hot water temperature or a combination control of the heating control and a control of a refrigerant flow rate from the generator to and condenser, and control device for controlling the operation of the refrigerant blow device by a cold water exit temperature of an evaporator.

6 Claims, 3 Drawing Sheets

ABSORPTION SYSTEM HOT AND COLD WATER SUPPLY APPARATUS

BACKGROUND OF THE INVENTION

This invention relates to an improvement in an absorption system hot and cold water supply apparatus of the type for simultaneously supplying hot and cold water by forming a circulation path for a refrigerant and an absorbent solution, providing a generator with a water heater and defining a refrigerant circulation path between these devices.

An absorption system hot and cold water supply apparatus of the type described above is disclosed, for example, in Japanese Patent Publication No. 52-584/1977 (corresponding to U.S. Pat. No. 3,837,174). The apparatus of this prior art reference includes a capacity controller (thermocapacity controller) for controlling the quantity of heat of a generator by a cold or hot water temperature or for controlling the quantity of heat in combination with the control of a refrigerant flow rate, for example, and includes also a protective thermostat in a cold water conduit so that this thermostat stops the operation of a pump for refrigerant solution at a specific cold water temperature (e.g. 3° C.) and the thermo-capacity controller stops heating of the generator at a temperature lower than this specific cold water temperature.

In the absorption system hot and cold water supply apparatus for simultaneously supplying the hot and cold water of the type described above, however, the quantity of heat from the generator must be regulated in proportion to a hot water load when the hot water load is large but a cold water load is small. Accordingly, the cold water output for the cold water load, that is, the evaporation capacity of the refrigerant in the evaporator, that is, the refrigerant absorption capacity of the absorbent solution in the absorber or, in other words, the degree of concentration of the absorbent solution inside the generator, is likely to become excessively high and hence freezing of the refrigerant or the cold water is likely to occur in the evaporator.

Therefore, the conventional absorption system hot and cold water supply apparatus described above employs a method which stops the operation of the refrigerant pump by a protective thermostat disposed in a cold water conduit at a specific cold water temperature, stops the concentration of the absorbent solution at a lower temperature than this specific temperature by cutting off heating of the generator and prevents the freezing of the cold water. However, this method needs a considerable time for the concentration of the absorbent solution in the absorber to drop or in other words, for the saturation temperature in both the evaporator and the absorber to rise to a normal value, so that the problems such as freezing of the refrigerant and the cold water at the time of the temperature drop of the cold water, for example, and crystallization of the absorbent solution cannot be prevented. Since heating of the generator must often be cut off in order to prevent the freezing, the hot water output to the hot water load becomes unstable and insufficient.

SUMMARY OF THE INVENTION

With the background described above, the present invention contemplates to provide an absorption system hot and cold water supply apparatus which can more reliably prevent freezing of the refrigerant and the cold water and crystallization of the absorbent solution than the prior art apparatus and can obtain a more stable hot water output.

For solving the problems encountered in the prior art apparatus described above, the present invention provides a capacity controller disposed in the absorption system hot and cold water supply apparatus which has a control device for controlling the operation of the refrigerant blow device for blowing the refrigerant to the absorbent solution by the cold water exit temperature of the evaporator.

In the absorption system hot and cold water supply apparatus in accordance with the present invention, the control device of he capacity controller carries out control in such a manner as to operate the refrigerant blow device when the cold water exit temperature reaches a predetermined value (e.g. 5.0° C.) so that the concentration of the absorbent solution in the absorber drops rapidly. Due to this action, the saturation temperature in the evaporator and in the absorber recovers more rapidly to a normal value (e.g. 6° to 8° C.) than in the prior art apparatus. Accordingly, when the hot water load is remarkably greater than the cold water load, the frequency of the ON/OFF operation of the generator is drastically reduced and freezing of the cold water and the refrigerant as well as crystallization of the absorbent solution can be prevented more reliably. Moreover, the hot water output to the hot water load can be made more stable. In such a case, the concentration of the absorbent solution returned from the absorber to the generator drops and the boiling temperature of the absorbent solution circulating through the generator drops, too, so that the quantity of sensible heat consumed in the generator can be reduced and the hot water output can be obtained more efficiently.

The above and other objects, novel features and advantages of the present invention will become more apparent from the following description when taken in conjunction with the accompanying drawings.

PREFERRED EMBODIMENT OF THE INVENTION

Figure 1:
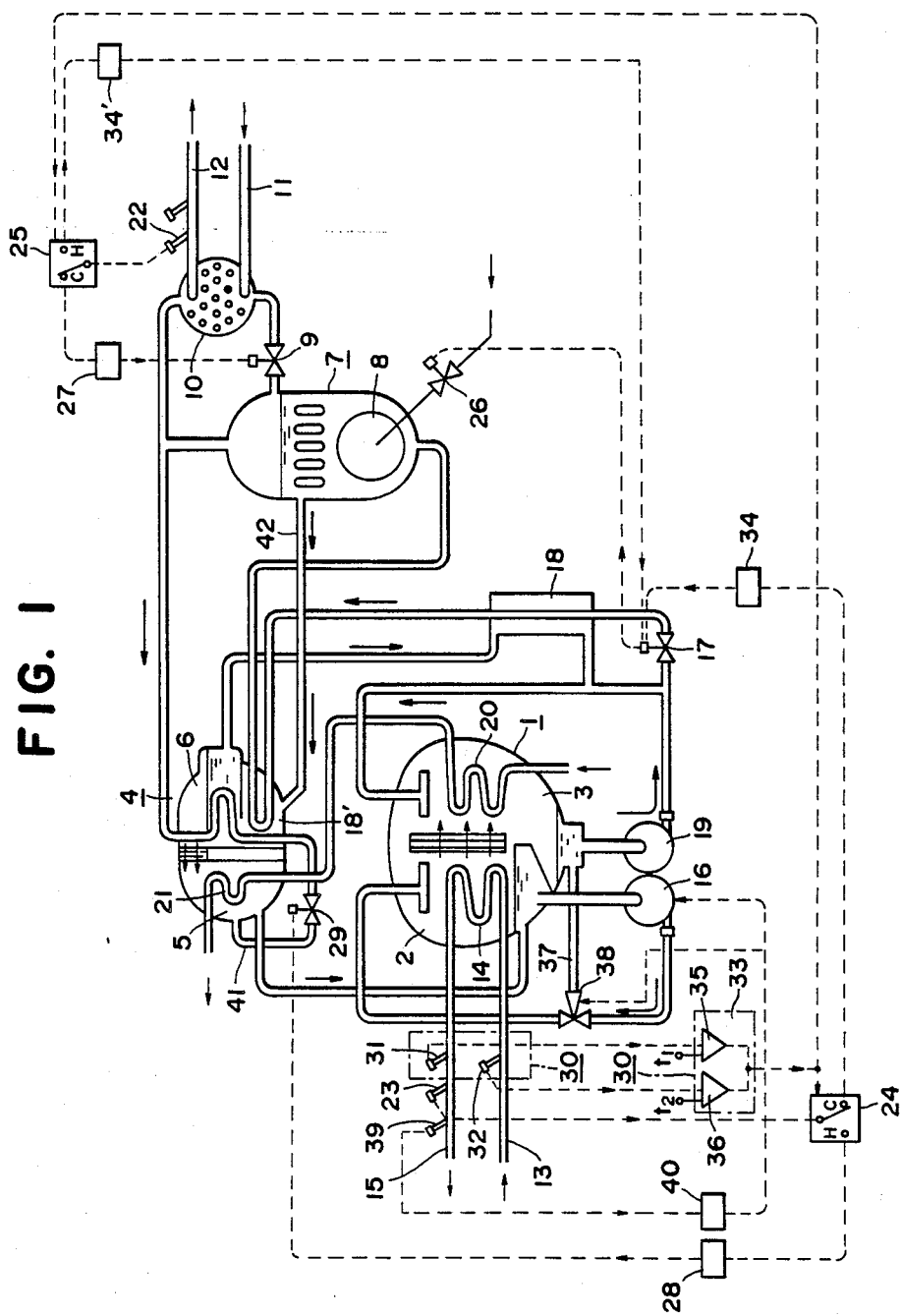
FIG. 1 is a schematic diagram of the construction of an absorption system hot and cold water supply apparatus in accordance with one embodiment of the present invention.

The absorption refrigerating machine as used herein comprises an evaporation-absorption unit 1 having evaporator 2 and absorber 3, condensation-generation unit 4 having condenser 5 and low pressure refrigerant generator 6, high pressure refrigerant generator 7 having heater 8, for example, a direct fired generator, hot water unit 10 and heat exchanger 18. Further, control valves 9 and 29 are provided, with valve 9 placed below hot water heat exchange unit 10, and connected between high pressure refrigerant generator 7 and the shell side of hot water heat exchange unit 10. Valve 29 is placed below condensation-generation unit 4 and connected between condenser 5 and high pressure refrigerant generator 7 through low pressure refrigerant generator 6, serving as a second-effect separation zone.

In the apparatus described above, hot water is produced at exit conduit 12 by the heat exchange between the refrigerant vapor in hot water heat exchange unit 10 and the water fed through entrance conduit 11 into the tube side of hot water heat exchange unit 10. Cold water, on the other hand, is produced in heat exchanger 14 located in an evaporator 2 by cooling the water fed through an entrance conduit 13.

In operation, a dilute solution comprising a refrigerant and an absorbent, preferably a solution of lithium bromide in water, is poured into high pressure refrigerant generator 7, subsequently heated by eater 8 utilizing preferably combustion heat and thereby separated into refrigerant vapor and a partially-concentrated solution. All or a portion of the refrigerant vapor separated from the absorbent solution is fed to the shell side of hot water heat exchange unit 10, condensed by transferring latent heat to the tube side water and recycled via valve 9 to high pressure refrigerant generator 7. (Necessarily, the tube side water is heated.) Depending upon the amount recycled (the adjustment of valve), all or a portion of the refrigerant vapor generated in high pressure refrigerant generator 7 is fed to low pressure refrigerant generator 6 and then to condenser 5. Concurrently, the partially concentrated solution in high pressure refrigerant generator 7 is passed to low pressure refrigerant generator 6 through conduit 42. In low pressure refrigerant generator 6, the partially-concentrated solution is heated by the refrigerant vapor passing through the tube side and further concentrated resulting in the generation of more refrigerant vapor. The refrigerant vapor generated in low pressure refrigerant generator 6 is mixed in condenser 5 with the refrigerant vapor transferred from high pressure refrigerant generator 7 and condensed. The condensed refrigerant is passed to evaporator 2 and is cycled by refrigerant pump 16 to exchange heat with water passing through the tube side of heat exchanger 14, producing cold water in exit conduit 15.

The refrigerant evaporated in evaporator 2 is absorbed by the absorbent solution in absorber 3, and transferred to the high pressure refrigerant generator 7 through absorbent solution control valve 17 and heat exchanger 18, and separated again from the absorbent solution in high pressure refrigerator generator 7.

In the diagram, symbol 19 indicates a pump which transfers absorbent solution to absorber 3, and the symbols 20 and 21 indicate heat exchangers in which the absorbent solution and refrigerant are cooled by cooling water.

In the absorption system hot and cold water supply apparatus described above, a control device according to the present invention is arranged as follows.

In FIG. 1, exit conduit 12 for the hot water is provided with thermo-detector 22 that detects the temperature of the hot water released from the apparatus while exit conduit 15 for cold water is provided with three thermo-detectors 23, 31 and 39. In addition, entrance conduit 13 for cold water is provided with thermo-detector 32 that detects the temperature of the water fed into heat exchanger 14. Thermo-detector 22 for detecting the exit temperature of the hot water and thermo-detector 23 for detecting the temperature of cold water are connected with fixed contact points for cooling-heating changeover switches 24 and 25. Thermo-detector 23 may be connected to either main thermo-controller 34 through cooling contact point of switch 34 or auxiliary thermo-controller 28 through heating contact point of switch 24. And thermo-detector 22 may be connected to either auxiliary thermo-controller 27 through cooling contact point of switch 25 or main thermo-controller 34 through heating contact point of cooling-heating changeover switch 25.

On the other hand, load detector 30 consists of thermo-detector 31 that detects the exit temperature of the cold water, thermo-detector 32 that detects the entrance temperature of the water to be cooled and changeover control comparative device 33. Changeover switches 24 and 25 are operated in parallel automatically by load detector 30, thereby connecting the fixed contact points with either the cooling contact points or heating contact points. Either main thermo-controller 34 or 34', respectively, is controlled by the temperature of the cold water when the load of the cold water circuit is greater than the predefined load or the temperature of the hot water when said load is smaller than the predefined load. Therefore, one of main thermo-controllers 34 and 34', which serves as a proportional controller for the absorbent solution control valve 17 regulating the circulating quantity of absorbent solution and fuel control valve 26 regulating the quantity of the fuel for heater 8, is controlled selectively by the temperature of either the cold water or the hot water by means of either changeover switch 24 or 25. Further, when thermo-detector 22 or 23 is not connected to main thermo-controllers 34 and 34' but to auxiliary thermo-controller 28 or 27 by means of changeover switch 24 or 25, respectively, the capacity is offered for controlling the cold water circuit or the hot water circuit, which are connected with said auxiliary thermo-controllers 28 or 27, respectively (apart from the thermo-control of all of the circuits which are controlled by main thermo-controller 34 or 34'). For example, the temperature of the hot water and the heating capacity are controlled by means of auxiliary thermo-controller 27 by changing the area of heat conduction of hot water heat exchange unit 10 due to the rise and fall of the refrigerant solution level in the shell side as caused by control valve 9. The temperature of the cold water and the cooling capacity are controlled by auxiliary thermo-controller 28 by regulating the opening of refrigerant control valve 29, which is arranged in refrigerant conduit circuit 41 located between low pressure generator 6 and condenser 5.

In the action of the control device, thermo-detectors 22 and 23 operate the devices and apparatus having thermo-control capacity in combination with main thermo-controllers 34 and 34'. Thus, these detectors and main thermo-controllers may be generally termed proportional controllers. In other words the proportional controllers for the cold water circuit and hot water circuits are represented by proportional controller 23-34 and proportional controller 22-34', respectively. When an electric thermo-detector is used, it is generally able to obtain an output from the amplifier of the detector that results from the disposition in the amplifier of a main thermo-controller which has the function of proportional control. Therefore, the meaning of the term "proportional controller" is not intended to be limited to the above example only. If necessary, it is possible to use the thermo-detector as the proportional controller separately. Further, the term "devices and apparatus having thermo-control capacity" or "thermo-capacity control means" is used as a general term for the devices and apparatus which control the complete hot and cold water circuit. For example, the term includes absorbent solution control valve 17 and fuel control valve 26. It is, however, possible to achieve the purposes of the invention without setting limits to these valves.

The operation of the above control device for the absorption system hot and cold water supply machine will be further apparent from the following description.

When the load of the cold water circuit is greater than a certain quantity—for example, 30 percent of the total hot and cold water load—both fixed contact points of the changeover switches 24 and 25 are connected with cooling contact points by load detector 30. Therefore, proportional controller 23 - 34, arranged in the cold water circuit, operates the devices and apparatus having thermo-control capacity such as absorbent solution control valve 17 and fuel control valve 26 and controls the cold water capacity as the proportional control for the total hot and cold water circuits, i.e., complete refrigerant circuit. On the other hand, thermo-detector 22 detects the exit temperature of the hot water and operates auxiliary thermo-controller 27, by which control valve 9 is regulated and causes the rise and fall of the refrigerant solution level in the shell side of hot water heat exchange unit 10 resulting in the change of the area of heat conduction. Thus, the hot water circuit is controlled separately from the proportional control for the complete hot and cold water circuit, whereby hot water having a temperature within a fixed temperature range is obtained.

In addition, when the load of the cold water circuit is less than a certain quantity, changeover switches 24 and 25 are changed automatically by load detector 30, thus causing fixed contact points to connect with heating contact points respectively. Therefore, proportional controller 22-34', arranged in the hot water circuit, operates absorbent solution control valve 17 and fuel control valve 26, whereby the thermo-control capacity of the complete refrigerant circuit of the machine is controlled by the temperature of the hot water, serving as an input for the control.

For example, in such case, thermo-detectors 31 and 32 detect the respective exit and entrance temperatures of the cold water, and transmit the detected signals to comparators 35 and 36, in which respective fixed temperatures are preset, respectively. Accordingly, load detector 30 operates changeover switches 24 and 25 in parallel motion when both the exit and entrance temperatures of the cold water are lower than the respective predefined temperatures $t_1$ and $t_2$, ($t_1 < t_2$)—i.e., when the load of the cold water is small—or when both the exit and entrance temperatures of the cold water are higher than the respective predefined temperatures $t_1 + \alpha$, $t_2 + \beta$, i.e., when the load of the cold water is large. When the total thermo-control capacity of the hot and cold water supply apparatus is regulated by control of the hot water circuit, the cold water circuit is regulated by the control of the quantity of the refrigerant vapor transferred from low pressure generator 6 to condenser 5; such control being caused by the regulation of the heating capacity of low pressure generator 6 in proportion to the refrigerant vapor which in turn results from the adjustment of refrigerant control valve 29 by auxiliary thermo- controller 28 by means of a thermo-detector for cold water.

According to the present invention, conduit 37 for blowing the refrigerant is provided to connect the conduit on the discharge side of the refrigerant pump 16 to the liquid reservoir of the absorber 3 through a three-way valve 38. Opening/closing of the three-way valve 38 of the conduit 37 and start/stop of the refrigerant pump 16 are controlled by controller 40 to which thermo-detector 39 is connected in the following schedule. For instance, when the sensing temperature of the thermo-detector 39 drops down to the fixed lower limit temperature 5° C. of temperature setting portion of the controller 40, the controller 40 changes over opening and closing of the three-way valve 38 so that the concentration of the absorbent solution is rapidly decreased while the refrigerant is blown into the absorbent solution, whereas spray of the refrigerant solution into the heat exchanger 14 is cut off. Thereafter, the operation of the refrigerant pump is stopped.

When the sensing temperature of the thermodetector 39 returns to the fixed temperature 5.5° C. of the controller 40, opening/closing of the three-way valve 38 is changed over to the original state and thereafter the refrigerant pump 16 is operated once again. The controller 40 incorporates therein circuits such as a delay relay, a timer, etc, though not shown in the drawing.

It is possible to keep the saturation temperature inside the evaporation-absorption unit 1 at about 5° C. or above and to prevent freezing of the refrigerant inside the evaporation-absorption unit 1 or the freezing of the cold water in the heat exchanger 14 or the crystallization of the dilute absorbent solution inside the absorber 3 or the crystallization of the concentrated absorbent inside the heat exchanger 18 while obtaining a stable output of the hot water proportional to the hot water load, since the three-way valve 38 and the refrigerant pump 16 are controlled by the controller 40 at the time of the hot water main control of the absorption system hot and cold water supply apparatus, that is, at the time of the capacity control when the cooling-heating changeover switches 24, 25 are closed to the H side, without stopping heating of the high pressure refrigerant generator 7. Also at the time of the cold water main control of the absorption system hot and cold water supply apparatus, refrigeration and crystallization of the absorbent solution can be prevented naturally by the control of the controller 40.

Figure 2:
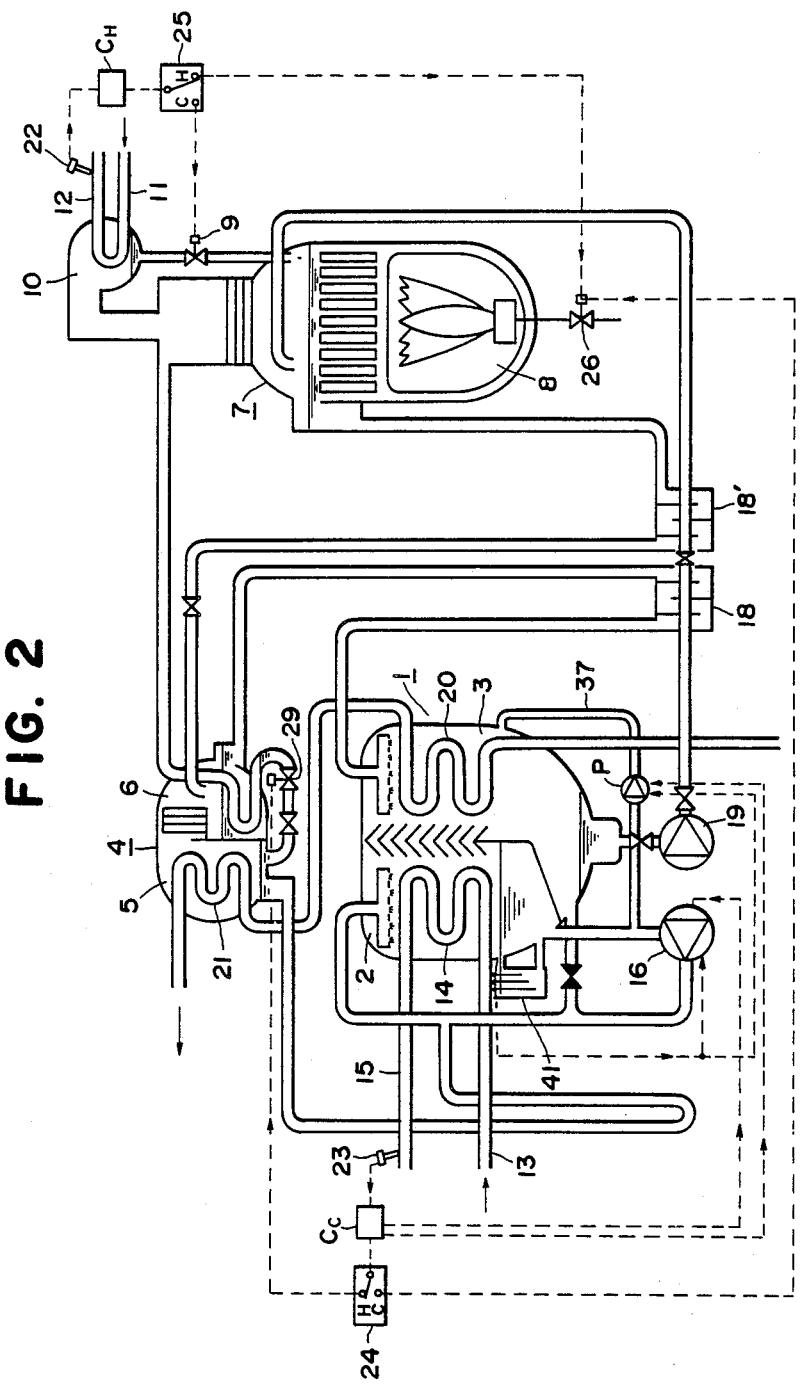
FIG. 2 is a schematic diagram of the absorption system hot and cold water supply apparatus in accordance with another embodiment of the present invention.

FIG. 2 is an explanatory view useful for explaining schematically the absorption system hot and cold water supply apparatus in accordance with another embodiment of the present invention. In this drawing, like reference numerals are employed to represent like constituents as in FIG. 1. In FIG. 2, symbol $C_c$ represents a controller which is used at the time of the cold water main control of the absorption system hot and cold water supply apparatus. This controller has the functions of the thermo-controllers 28, 34, 40 shown in FIG. 1. Symbol $C_H$ represents a controller at the time of the hot water main control which has the function of the thermo-controllers 27, 34' shown in FIG. 1. In other words, the capacity controller of the absorption system hot and cold supply apparatus in the embodiment of FIG. 2 consists of the thermo-detectors 22, 23, the controllers $C_C$, $C_H$, the control valve 9, the fuel control valve 26 and the refrigerant control valve 29. Discharge rate control of the pump 19 by the controller $C_C$ and or $C_H$ may be incorporated in this capacity controller.

The controller $C_C$ has also the function of the controller 40 shown in FIG. 1 and this controller $C_c$ controls ON/OFF operations of the refrigerant blow pump P of the conduit 37 and the refrigerant pump 16 as shown in FIG. 3. At the time of the hot water main control of the absorption system hot and cold water supply apparatus, that is, when the opening of the fuel control valve 26 is controlled by the signal of the thermo-detector 22 for detecting the hot water exit temperature through the controller $C_H$, the operation of the refrigerant pump 16 is stopped when the cold water exit temperature drops down to 5° C. as shown in FIG. 3 and, at the same time, the operation of the refrigerant blow pump P is started. Accordingly, the spray of the cold water to the heat exchanger 14 is cut off, the temperature drop of the cold water due to evaporation of the refrigerant is prevented and, at the same time, the absorbent solution inside the absorber 3 is diluted to promote the rise of the saturation vapor pressure as well as the saturation temperature so that freezing of the refrigerant and cold water and crystallization of the absorbent solution can be prevented without stopping heating of the evaporation-absorption unit 1 even when the cold water temperature becomes somewhat lower than the ordinary cold water temperature, and a stable output of the hot water in proportion to the load can be obtained. Since the concentration of the absorbent solution returned to the evaportation-absorption unit 1 becomes low at this time, the boiling temperature of the absorbent solution inside the unit 1 drops and consequently the quantity of consumption of the sensible heat of the absorbent solution decreases in an amount corresponding to this temperature drop. Thus thermal efficiency of the hot water output can be improved. In FIG. 2, reference numeral 41 designates a level controller which controls also the operation of the pumps 16 and P.

When the cold water exit temperature rises and returns to 5.5° C., the refrigerant pump 16 is again actuated and, at the same time, the operation of the refrigerant blow pump P is stopped so that the operation of the apparatus returns to the cold/hot water simultaneous supply operation by the ordinary capacity control at the time of the hot water main control. Incidentally, the control of the pumps 16 and P may be discharge control besides the ON/OFF control. In this embodiment, the temperature range of the temperature control capacity control of the cold water is set to be from 6° to 8° C. and that of the hot water, from 48° to 52° C.

Figure 3A:
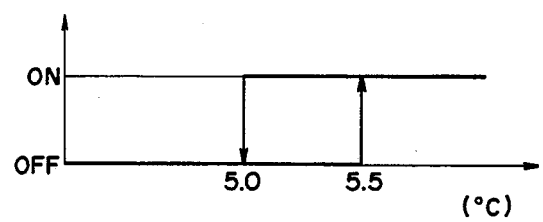
FIGS. 3A and 3B are diagrams showing an example of a refrigerant pump and the operation of a refrigerant blow pump, respectively in the embodiment shown in FIG. 2.
Figure 3B:
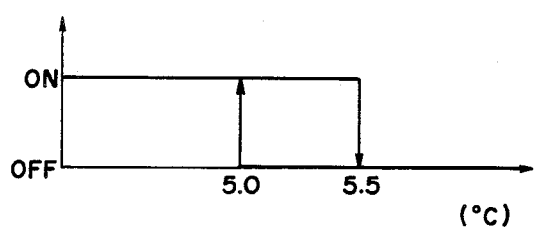

Needless to say, the control shown in FIGS. 3A and 3B is not particularly limited to the hot water main control but can also be carried out at the time of the cold water main control operation and at the time of the operation for taking out only the cold water. In this embodiment, the contacts are changed over manually for the cooling-heating changeover switches 24, 25. It is also possible in this embodiment to provide a microcomputer (not shown), for example, in the controllers $C_C$ and $C_H$ so that the microcomputer calculates the hot water load and the cold water load by the signals of the thermo-detectors 22, 23 and their proportion and automatically changes over the contacts of the switches 24 and 25 on the basis of the set value of this proportion as a reference.

According to the present invention, the thermocapacity controller is provided with the function of controlling the operation of a refrigerant blowing device into an absorbent solution by a cold water exit temperature, as described above. Accordingly, the present invention can prevent the excessive drop of the saturation vapor pressure and saturation temperature in an evaporator as well as in an absorber, that is, the freezing of a refrigerant and cold water. In particular, the present invention provides a great practical benefit of preventing the freezing of the refrigerant and cold water and crystallization of the absorbent solution while obtaining stable a hot water output in proportion to a hot water load while keeping the heating of the evaporation-absorption unit at the time of the hot water main control where the heating control of the evaporation-absorption unit is carried out in accordance with the hot water temperature. The present invention can be applied not only to a dual-effect absorption system hot and cold water supply apparatus but also to a single-effect absorption system hot and cold water supply apparatus.

What is claimed is:

1. An absorption system hot and cold water supply apparatus, comprising:
    a generator, a condenser, an evaporator having means for conducting water in heat exchange relation therethrough for obtaining cold water and having a cold water outlet, an absorber, a solution heat-exchanger, and a solution pump, and piping forming a refrigerant circulation path for circulating a refrigerant and an absorbent solution circulation path for circulating an absorbent solution through the generator, the condenser, the evaporator, the absorber, the solution heat exchanger and the solution pump;
    refrigerant blow means connected to said absorbent solution circulation path and controllable for blowing refrigerant into said absorbent solution circulation path and stopping spray of refrigerant into said evaporator;
    thermo-capacity control means for controlling at least the quantity of heat produced by said generator in response to a water temperature of water supplied by said apparatus; and
    controlling means forming part of said thermo-capacity control means and connected to said refrigerant blow means for controlling the operation of said refrigerant blow means in response to the cold water outlet temperature from said evaporator.

2. An absorption system hot and cold water supply apparatus according to claim 1, wherein said refrigerant blow means has a pump for blowing said refrigerant.

3. An absorption system hot and cold water supply apparatus according to claim 1, wherein said thermo-capacity control means has means for making combination control of heating control of said generator and by a refrigerant flow rate from said generator to said condenser.

4. An apparatus as claimed in claim 1 in which said refrigerant blow means comprises a refrigerant circulating path including a refrigerant pump, and a three-way valve between said refrigerant circulation path and said absorption solution circulating path.

5. An apparatus as claimed in claim 4 in which said control means includes a thermo-detector for detecting the cold water outlet temperature of said evaporator, and said control means is connected to said three-way valve and to said refrigerant pump for controlling the opening and closing of said three-way valve and the ON/OFF operation of said refrigerant pump in response to the temperature detected by said thermo-detector.

6. An apparatus as claimed in claim 5, wherein said control means is operable for controlling said three-way valve and said refrigerant pump when said thermo-capacity control means is operable for controlling the quantity of heat produced by said generator in response to the temperature of the hot water produced by said generator.

* * * * *